(12) United States Patent
Okada et al.

(10) Patent No.: US 7,308,132 B2
(45) Date of Patent: Dec. 11, 2007

(54) METHOD FOR ROBUST SCALE-SPACE ANALYSIS OF 3D LOCAL STRUCTURES IN MEDICAL IMAGES

(75) Inventors: Kazunori Okada, Plainsboro, NJ (US); Dorin Comaniciu, Princeton Jct., NJ (US); Luca Bogoni, Philadelphia, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 698 days.

(21) Appl. No.: 10/892,646

(22) Filed: Jul. 16, 2004

(65) Prior Publication Data

US 2005/0036710 A1 Feb. 17, 2005

Related U.S. Application Data

(60) Provisional application No. 60/488,603, filed on Jul. 18, 2003.

(51) Int. Cl.
*G06K 9/00* (2006.01)
(52) U.S. Cl. .................. 382/154; 382/128; 382/286
(58) Field of Classification Search ............. 382/128, 382/151, 154, 203, 286, 291; 345/419–420
See application file for complete search history.

(56) References Cited

OTHER PUBLICATIONS

Kazunori Okada, et al., "Robust Scale-space Analysis of 3D Local Structures in Medical Images," Jul. 14, 2003, pp. 1-7.

Tony Lindeberg, "Feature Detection and Automatic Scale Selection," May 1996, revised Aug. 1998, pp. 1-51.

Yixin Chen et al., "Estimating Symmetric, Positive Definite Matrices in Robotic Control." pp. 1-6, May 2002.

Dorin Comaniciu, "An Algorithm for Data-Driven Bandwidth Selection," IEEE Transactions on Patterns Analysis and Machine Intelligence, vol. 25., No. 2., Feb. 2003, pp. 1-8.

Dorin Comaniciu, et al., "Mean Shift: A Robust Approach Toward Feature Space Analysis," IEEE Transactions on Patterns Analysis and Machine Intelligence, vol. 24., No. 5., May 2002, pp. 1-18.

Sabine Van Huffel, et al., "The Total Least Squares Problem," Society of Industrial and Applied Mathematics, 1991, pp. 27-47.

Comaniciu D: "An Algorithm for Data-Driven Bandwidth Selection" IEEE Transactions on Pattern Analysis and Machine Intelligence, New York, US, vol. 25, No. 2, Feb. 2003, pp. 281-288, XP001179216 ISSN: 0162-8828, abstract, section 2: "Variable—bandwidths mean shift", section 4: "Algorithm for bandwidth selection".

(Continued)

*Primary Examiner*—Daniel Mariam
(74) *Attorney, Agent, or Firm*—Donald B. Paschburg; F. Chau & Associates, LLC

(57) ABSTRACT

A method for determining the location, shape and orientation of a tumor in a medical image includes finding a plurality of spatial extrema μ of a D-dimensional spatial signal f for a set of bandwidths H by performing mean shift-based gradient-ascent iterations for a set of bandwidths H and then determining a D-dimensional spread and orientation of the signal about each extrema μ by estimating a covariance Σ of the signal f for each extrema μ. The optimal estimate of μ and Σ is determined by performing a Jensen-Shannon divergence on the full set of μ and Σ.

12 Claims, 5 Drawing Sheets

OTHER PUBLICATIONS

Yixin Chen et al: "Estimating symmetric, matrices in robotic positive definite control" Proceedings 2002 IEEE International Conference on Robotic and Automation, May 11-15, 2002, Washington, DC, USA, May 2002, pp. 4269-4214, X P00 2329 114, p.4271, Theorem 111.3.

Cheng Y: "Mean Shift, Mode Seeking, and Clustering" IEEE Transactions on Pattern Analysis and Machine Intelligence, IEEE Inc. New York, US, vol. 17, No. 8, Aug. 1, 1995, pp. 790-799, XP000527671, ISSN: 0162-8828, section II: "Generalizing mean shift", section V: "mean shift clustering".

Comaniciu D et al: "The variable mean shift and data-driven scale bandwidth selection", International Conference on Computer Vision, Los Alamitos, CA : IEEE Comp. US, vol. vol. 1 of 2. Conf. 8, 7~Jul. 7, 2001, pp. 438-445, X P0 10 55 40 14, ISBN: 0-7695-1143-0, abstract, section 1: "Motivation for variable bandwidth".

Camaniciu D et al:"Real-time Tracking of Non-rigid objects using mean shift", Proceedings of the IEEE Computer Conference on Computer Vision and Pattern Recognition, Los Alamitos, CA : IEEE Comp. So, vol. vol. 2 of 2, Jun. 13, 2000, pp. 142-149, XP 00 1035635, ISBN: 0-7803-6527-5, section 4 "Tracking Algorithm".

Local multi-scale analysis results. Each row displays 3 orthogonal planes that intersect at the estimated tumor center. The blue and red crosses denote markers provided by radiologists and estimated by the algorithm, respectively. The red ellipses show the estimated anisotropic spreads and 3D orientations as intersections of the ellipsoid and the planes.

METHOD FOR ROBUST SCALE-SPACE ANALYSIS OF 3D LOCAL STRUCTURES IN MEDICAL IMAGES

CROSS REFERENCE TO RELATED UNITED STATES APPLICATIONS

This application claims priority from "Robust Scale-Space Analysis of 3D Local Structures in medical Images", U.S. Provisional Application No. 60/488,603 of Okada, et al, filed Jul. 18, 2003, the contents of which are incorporated herein by reference.

BACKGROUND OF THE INVENTION

A problem in the volumetric medical image analysis is to characterize the 3D local structure of tumors across various scales, because the size and shape of tumors varies largely in practice. Such underlying scales of tumors also provide useful clinical information, correlating highly with probability of malignancy. There are a number of previously proposed approaches addressing this problem. However, these prior art approaches are prone to be sensitive to signal noises and their accuracy degrades when the target shapes differ largely from an isolated Gaussian. In the medical domain, these constraints are too strong since many tumors appear as irregular shapes within noisy background signals.

SUMMARY OF THE INVENTION

This invention is directed to methods for the robust estimation of the covariance matrix that describes the spread and 3-dimensional (3D) orientation of the structure of interest. Given an input signal, a mean shift-based gradient ascent is performed for an extended mean-shift vector using all the available data points for each analysis bandwidth. The data points that converge to the same point are grouped together, forming a set of local structure candidates. These convergence candidates can be interpreted as spatial extrema of the signal. Then, for each candidate, the underlying scale is determined by estimating a covariance matrix by a constrained least-squares method. Finally, for each candidate, a stability test is performed across the analysis scales, resulting in an optimal scale estimate for each local target. As a result, one can find a signal's local scales that can vary spatially.

These methods utilize an algorithm, referred to herein as a mean shift-based bandwidth selection algorithm, for analyzing general discretized signals and estimating fully parameterized covariance matrices. With the methods of the invention, it becomes possible to address the problem of representing local structures in images. The robust mode and scale selection of the mean shift-based bandwidth selection algorithm together with the consideration of the fully parameterized covariance matrix also enables one to estimate a tumor's scale in more flexible and robust manner, mitigating the aforementioned shortcomings of the previous methods. Since many target objects in the medical domain possess complex 3D structures, the methods of the invention can be deployed for a number of different application scenarios.

DETAILED DESCRIPTION OF THE PREFERRED EMBODIMENT

1. Fixed-bandwidth Mean Shift Vector for Continuous Signals

Figure 1:
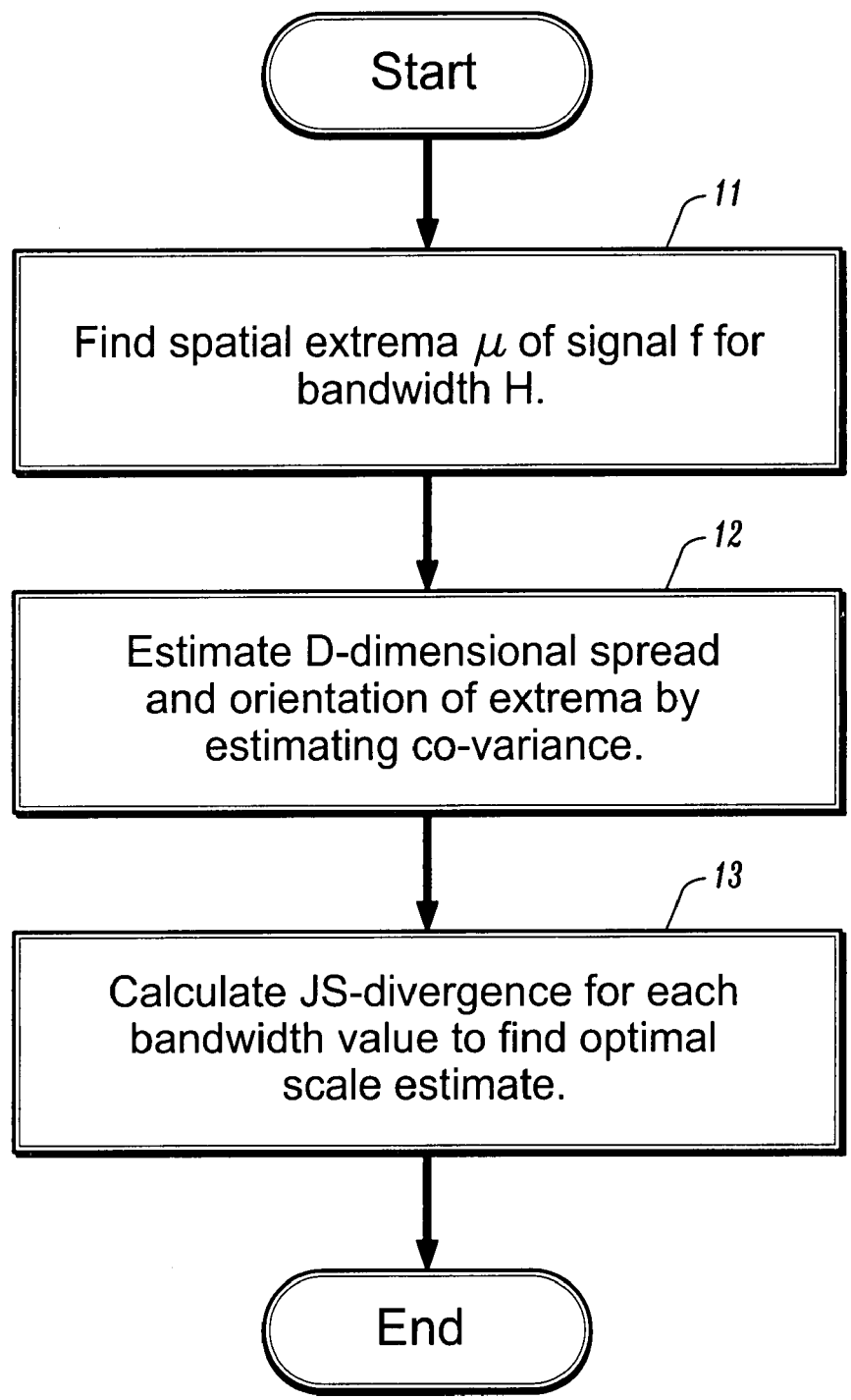
FIG. 1 is a flow chart depicting a method of a preferred embodiment of the invention.

A medical image can be represented by a D-dimensional continuous signal $f:R^D \to R$ evaluated at n d-dimensional points $x_i$, and the uncertainty associated with each point $x_i$ can be represented by a D×D matrix $H_i$, for an $i \in 1, \ldots n$. The matrices $H_i$ are referred to as bandwidth matrices. The signal can have one or more extrema. An extrema of the signal can be associated with a location of a tumor or other target object. Referring now to FIG. 1, a first step in the analysis of the medical image represented by f is to determine, at step 11, the spatial extrema µ of the signal. To find the extrema, one can first define a function, m (x; H), where x is a spatial location corresponding to a signal measurement and H is the corresponding bandwidth, referred to herein as an extended mean shift vector, by $$m(x; H) \equiv \frac{\int \mu \Phi(x - \mu; H) f(\mu) d\mu}{\int \Phi(x - \mu; H) f(\mu) d\mu} - x. \quad (3)$$

where a Gaussian kernel $\Phi(x-\mu; H)$ can be defined as $$\exp\left(-\frac{1}{2} D^2(x, \mu; H)\right)$$

with $D^2(x,\mu; H)=(x-\mu)^T H^{-1}(x-\mu)$ and $H^{-1}$ is a weighted harmonic mean of the bandwidth matrices, $$H^{-1}(x) = \sum_{i=1}^{n} w_i(x) H_i.$$

The weights can be defined as $$w_i(x) = \frac{\frac{1}{|H_i|^{\frac{1}{2}}} \exp\left(-\frac{1}{2} D^2(x, \mu; H_i)\right)}{\sum_{i=1}^{n} \frac{1}{|H_i|^{\frac{1}{2}}} \exp\left(-\frac{1}{2} D^2(x, \mu; H_i)\right)}$$

and can be normalized to unity.

Eq. (3) can be used to locate spatial extrema µ of f given a fixed analysis bandwidth H as follows. First, make an estimate of an extrema, $\mu_1$, and then evaluate $m_1$ (x; H) for this extrema from Eq. (3). If $y_1$ is used to denote the result of the first term of Eq. (3) for the initial estimate of $\mu_1$, then, for the next iteration of Eq. (3), x is replaced with $y_1$ and $\mu_1$ is replaced with $m_1$ (x; H), denoted as $\mu_2$. This process can be repeated, each time replacing the second term of Eq. (3)

with the result of the first term from the previous iteration, and evaluating the first term on the previous evaluation of m (x; H). For each iteration k of Eq. (3), the resulting difference will converge to zero. The value of $\mu_k$ for which the extended mean shift vector m (x; H) is sufficiently close to zero can be taken as an extrema of the signal f. The data space of the signal can be partitioned by grouping data points that converge into the same extrema.

2. Constrained Least-squares Solution of Covariance Matrices

The next step, step 12 of FIG. 1, is to estimate the D-dimensional spread and orientation of the tumors whose center μ as a spatial extremum was found in step 11. The geometrical information of a D-dimensional local surface can be characterized by a covariance matrix Σ estimated at the extrema.

The covariance Σ can be defined by the equation $m(x) \approx -H(\Sigma+H)^{-1}(x-\mu)$ when f can be approximated by a Gaussian. This can be rewritten in the following simple form, $$\Sigma H^{-1} m_i \approx b_i \equiv \mu - x_i - m_i \quad (4)$$

Considering all the trajectory points $\{x_i: i=1, \ldots, t_u\}$ that converge to an extremum μ, an over-complete set of linear equations can be contructed:

$$A\Sigma \approx B, \quad (5)$$

where $$A = (m_1; \ldots; m_{t_u})^T H^{-T},$$

$$B = (b_i; \ldots; b_{t_u})^T,$$

and where Σ is a symmetric, positive definite matrix in $R^{D \times D}$. The covariance can be estimated by a constrained least-squares solution of Eq. (5). This solution yields the following closed form, $$\Sigma^* = U_P \Sigma_P^{-1} U_{\tilde{Q}} \Sigma_{\tilde{Q}}^2 U_{\tilde{Q}}^T \Sigma_P^{-1} U_P^T; \quad (6)$$

where the solution involves the following symmetric Schur decompositions: $A^T A = U_P \Sigma_P^2 U_P^T$ and $B^T B \equiv Q$ with $\tilde{Q} = \Sigma_P U_P^T Q U_P \Sigma_P = U_{\tilde{Q}} \Sigma_{\tilde{Q}}^2 U_{\tilde{Q}}^T$. This closed form can be found by determining the unique minimizer for an area, $g(Y) \equiv \|AY - BY^{-T}\|_F^2$, where $\Sigma = YY^T$.

3. Scale Selection

The above two steps can result in pairs of center location and covariance estimates $\{\mu_h; \Sigma_h\}$ for each analysis bandwidth H. The next step, step 13, concerns finding the optimal estimate of the target structures analyzed across a range of bandwidths. This optimal estimate can be found by using a form of the Jensen-Shannon divergence, $$JS(h) = \frac{1}{2} \log \frac{\left| \frac{1}{2a+1} \sum_{j=h-a}^{h+a} \Sigma_j \right|}{\sqrt[2a+1]{\prod_{j=h-a}^{h+a} |\Sigma_j|}} + \frac{1}{2} \sum_{j=h-a}^{h+a} (\mu_j - \mu)^T \left( \sum_{j=h-a}^{h+a} \Sigma_j \right)^{-1} (\mu_j - \mu) \quad (7)$$

where $\mu = \frac{1}{2a+1} \sum_{h-a}^{h+a} \mu_j$.

Given a neighborhood parameter a, the divergence can be computed for each analysis bandwidth h. The extremum of the divergences JS(h) across the bandwidths can provide a final scale estimate that is most stable over a range of scales.

The stability test described requires the set of analysis bandwidths a priori. In one embodiment of the invention, H=hI and h is varied with a constant step. In order to achieve higher performance for the scale selection, it is preferred to have more densely distributed analysis bandwidths. However, such dense sampling can prohibitively enlarge the search space, especially when a fully parameterized H is considered.

4. Algorithm for Local Multi-scale Analysis

Figure 2:
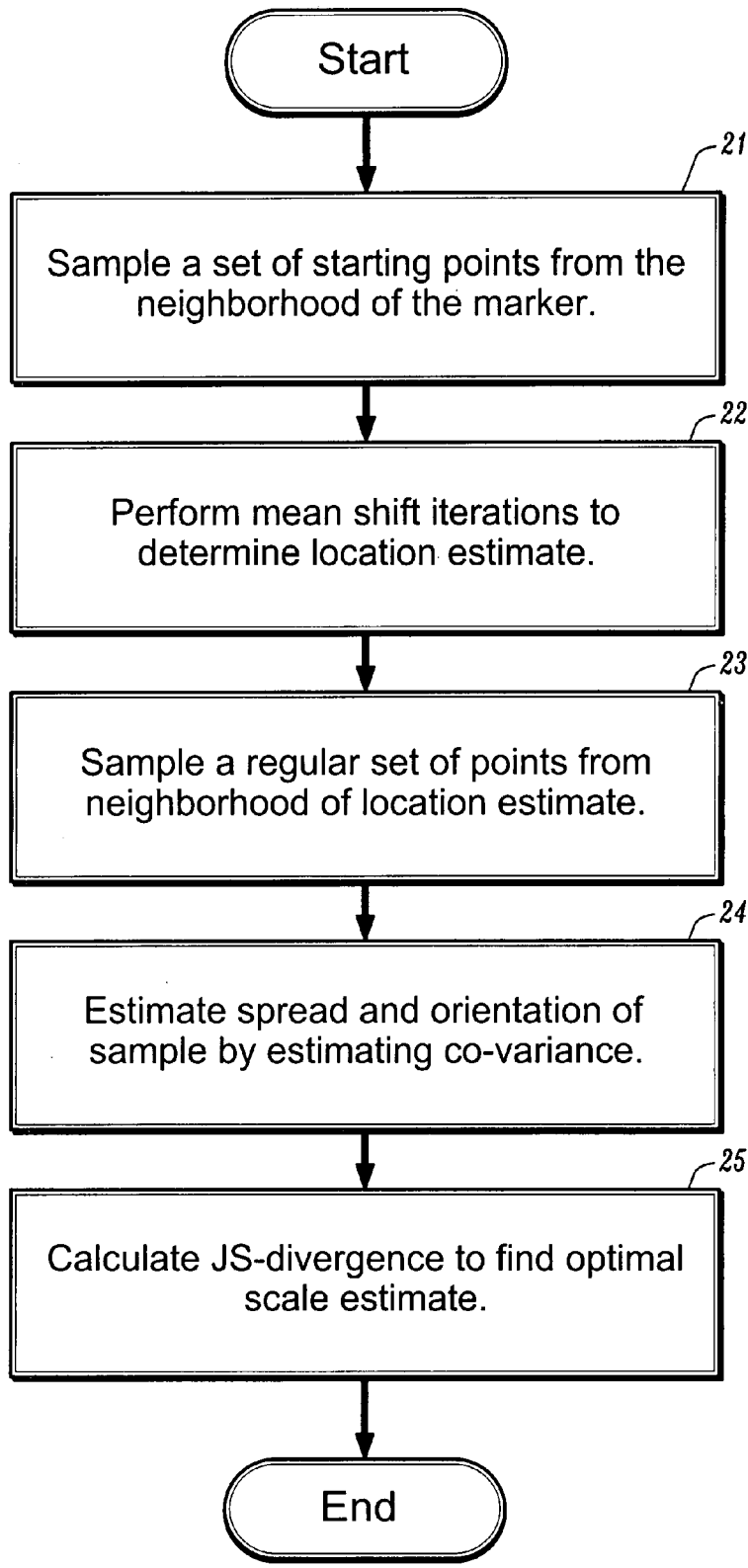
FIG. 2 is a flow chart depicting a method of another preferred embodiment of the invention.

In some application scenarios, the task to be solved is to represent the scale of local structure whose rough location is provided by another means. An example is the structural analysis of tumors whose locations in a volumetric image are provided manually by radiologist. The simplest strategy in such a case is to perform the mean shift iteration only from the given marker point. The convergence point serves as the tumor center estimate and all the trajectory points from the marker are used to estimate the scale. This naive strategy can fail when the provided locations are contaminated by uncertainties and when the iteration converges too soon, forcing the Eq.(4) to be under-complete and rank-deficient. These issues can be addressed by the following steps, depicted in FIG. 2. First, at step 21, consider a set of starting points sampled from the neighborhood of the marker. At step 12, after performing mean shift iterations, the point to which most starting points converged serves as a location estimate μ. Next, at step 13, a regular sampling around the estimate μ can be performed. The scale estimate Σ can be given by solving, at step 14, Eq. (4) using all the trajectory points that converged to μ. The same stability test of Eq. (7) can be used for the final estimate at step 15.

6. EXAMPLES

Figure 3:
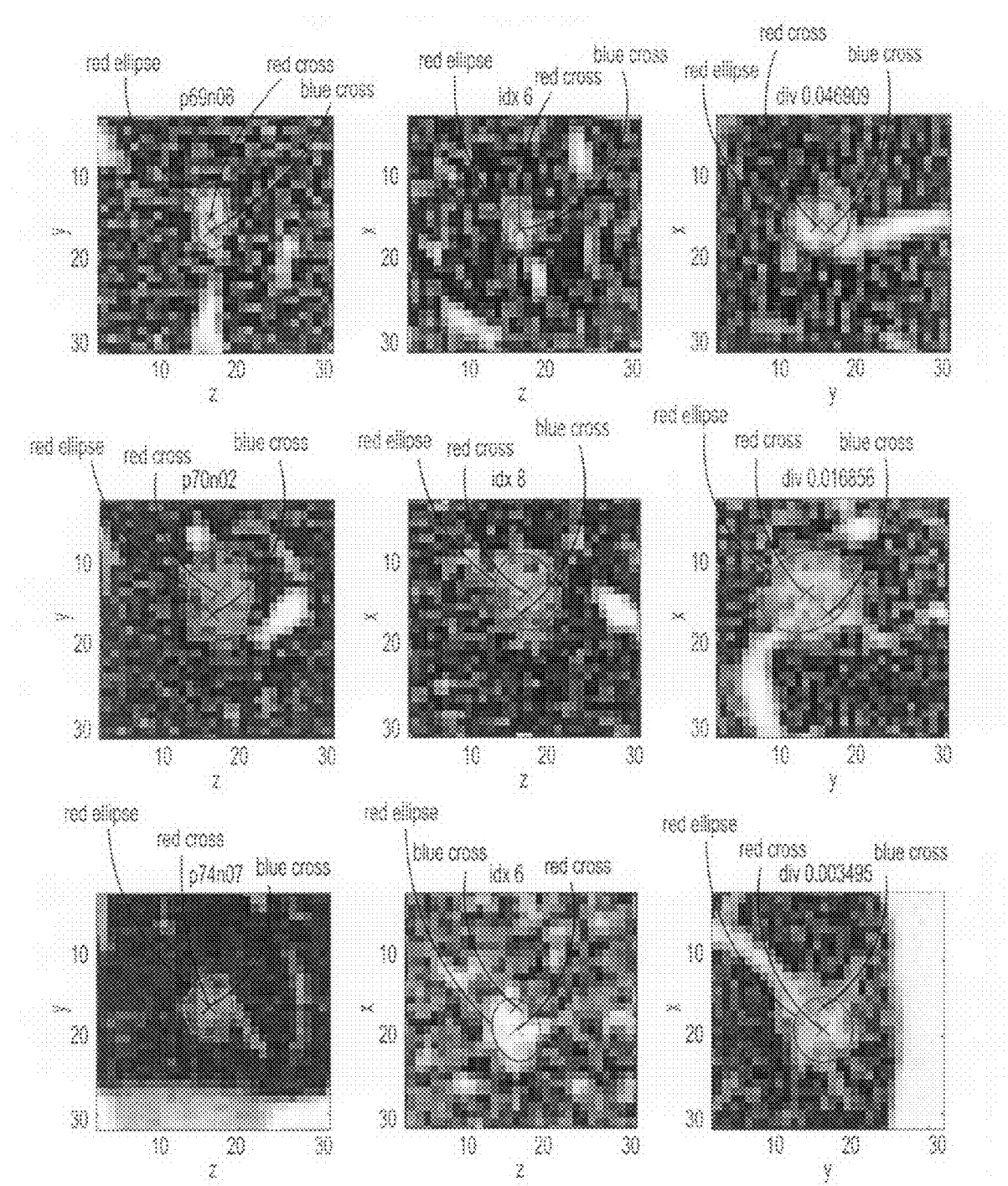
FIGS. 3-4 are images depicting results of analyses performed using a preferred method of the invention.
Figure 4:
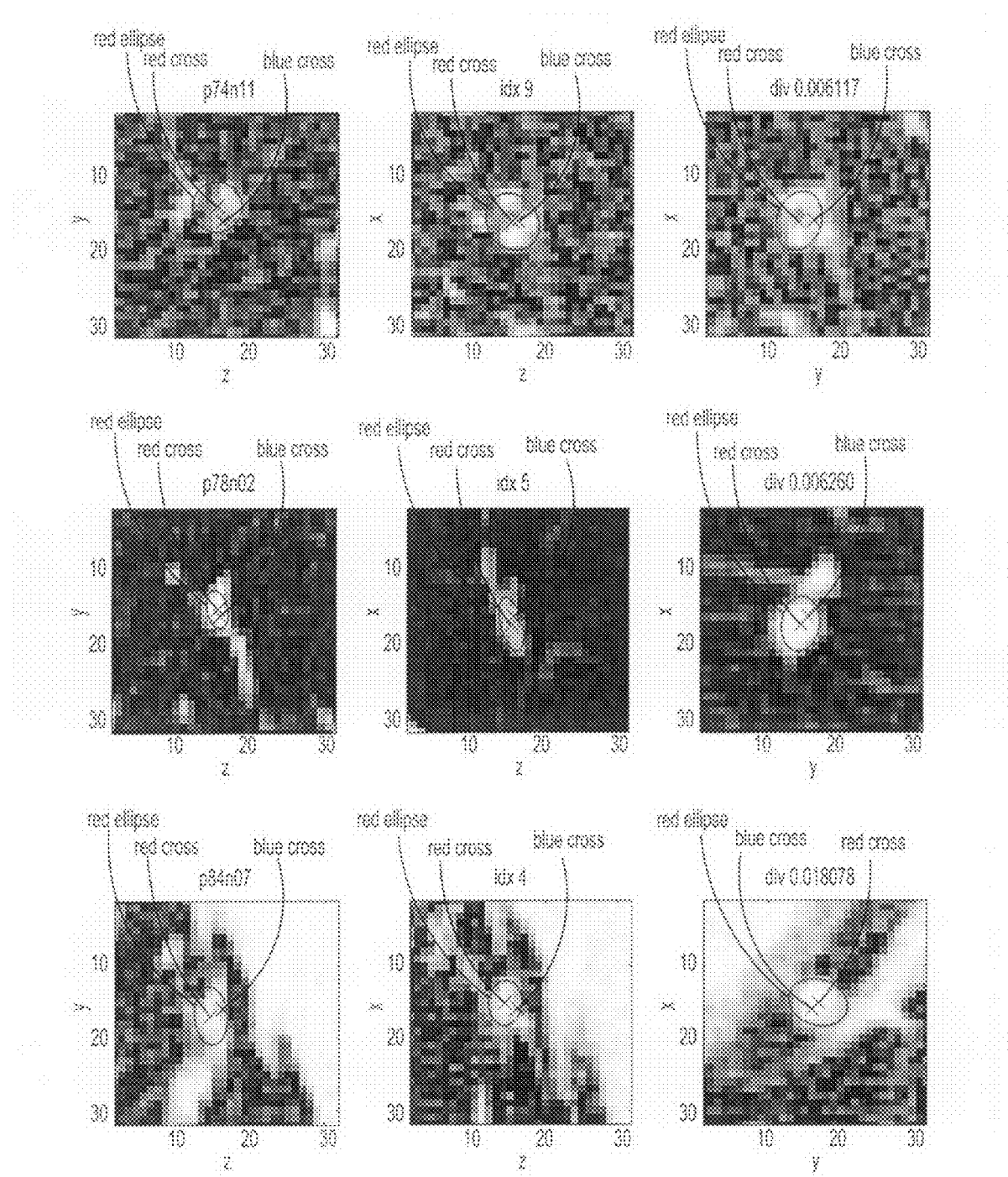

A 3D domain implementation of the local multi-scale analysis algorithm described in Section 5 is evaluated with high-resolution computerized tomography (HRCT) images of 14 patients displaying pulmonary tumors. A total of 44 analysis scales with 0.25 interval $h=(0.25^2; \ldots; 11^2)$ and a=1 were used. The rough location of the tumors were provided. As a pre-process, volumes of interest of size 32×32×32 are extracted using the markers. FIGS. 3 and 4 show examples of the resulting center and part-solid nodules whose geometrical shapes are more deviated from the simple Gaussian structure. The correct estimation of the tumor locations, spreads, and 3D orientations for these difficult cases demonstrates the effectiveness of the methods of the invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
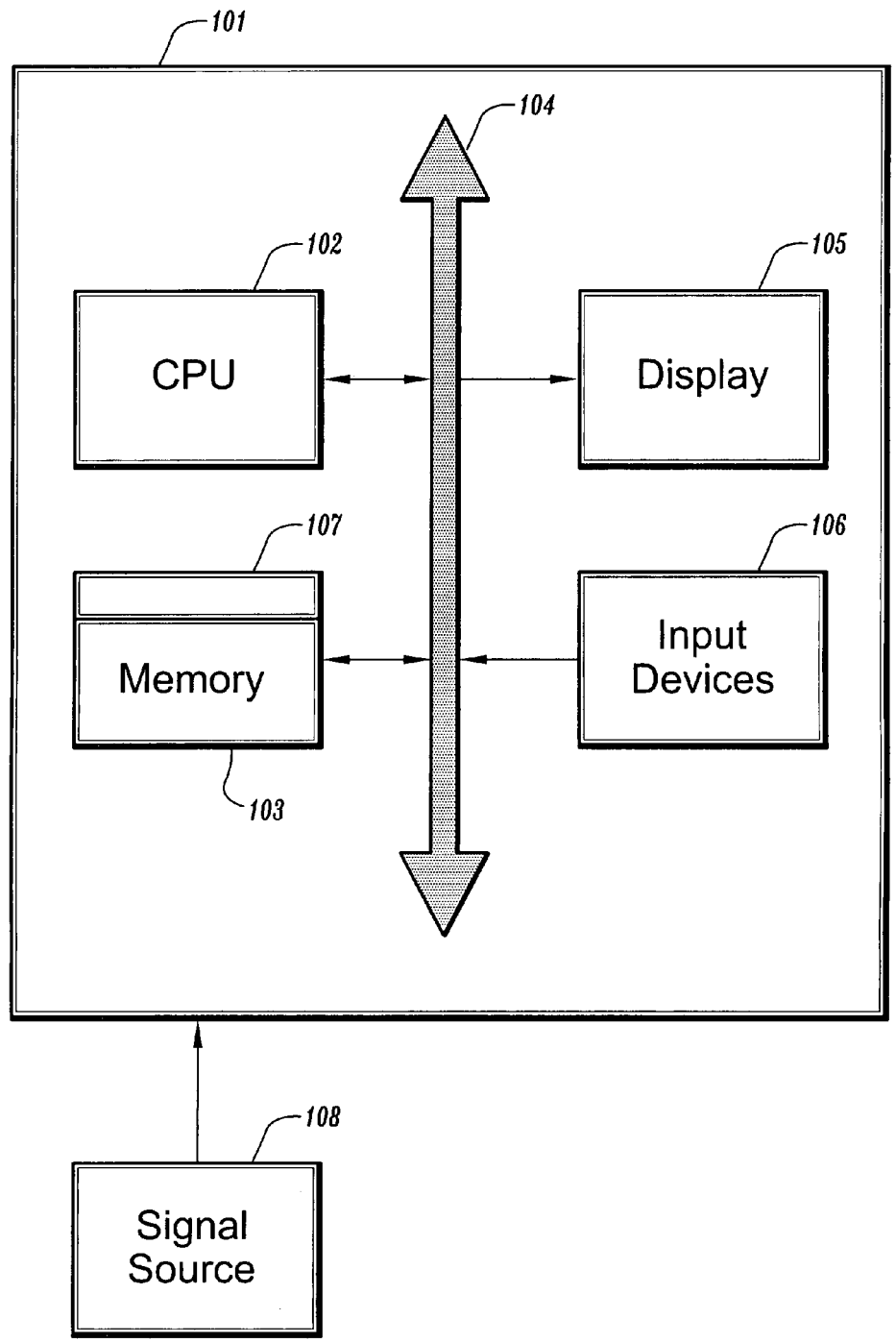
FIG. 5 depicts a preferred embodiment of a computer system for implementing a preferred method of the invention.

Referring now to FIG. 5, according to an embodiment of the present invention, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and a keyboard. The support circuits can include circuits such as cache, power supplies, clock circuits, and a communication bus. The memory 103 can include random access memory (RAM), read only memory (ROM), disk drive, tape drive, etc., or a combinations thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer system 101 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for analyzing three-dimensional structures in medical images, in order to determine the location, shape and orientation of a tumor, said method comprising the steps of:

finding at least one spatial extrema $\mu$ of a D-dimensional spatial signal f for a set of bandwidths H;

estimating a D-dimensional spread and orientation of the signal about each extrema $\mu$ by estimating a covariance $\Sigma$ of the signal f for each extrema $\mu$; and finding a most stable estimate of $\mu$ and $\Sigma$ from the at least one extrema $\mu$ and covariances $\Sigma$ to find from the signal f an optimal estimate of a target structure wherein the spatial extrema $\mu$ of signal f are found by solving an equation defined by $$m(x; H) \equiv \frac{\int \mu \Phi(x - \mu; H) f(\mu) d\mu}{\int \Phi(x - \mu; H) f(\mu) d\mu} - x$$

where m(x; H) is an extended fixed-bandwidth mean shift vector, x is a spatial location corresponding to a signal measurement, and $\Phi(x-u;H)$ is a Gaussian kernel for a bandwidth H.

2. The method of claim 1, wherein $\Phi(x-\mu; H)$ can be defined as $$\exp\left(-\frac{1}{2}D^2(x, \mu; H)\right)$$

wherein $D^2(x,\mu; H) = (x-\mu)^T H^{-1}(x-\mu)$ and $H^{-1}$ is a weighted harmonic mean of the bandwidth matrices, $$H^{-1}(x) = \sum_{i=1}^{n} w_i(x) H_i,$$

and wherein the weights can be defined as $w_i$ $$w_i(x) = \frac{\frac{1}{|H_i|^{\frac{1}{2}}} \exp\left(-\frac{1}{2} D^2(x, \mu, H_i)\right)}{\sum_{i=1}^{n} \frac{1}{|H_i|^{\frac{1}{2}}} \exp\left(-\frac{1}{2} D^2(x, \mu, H_i)\right)}$$

and can be normalized to unity.

3. The method of claim 1, wherein finding the spatial extrema $\mu$ of signal f comprises the steps of:

making an estimate of an extrema and evaluating the extended fixed-bandwidth mean shift vector for this extrema, wherein $y_1$ is used to denote the first term of m(x; H) for the initial estimate of $\mu_1$;

evaluating the extended fixed-bandwidth mean shift vector m(x; H), replacing the second term with $y_1$ and replacing the initial estimate of $\mu_1$ with the previous evaluation of m(x; H);

repeating said evaluations of the extended fixed-bandwidth mean shift vector m(x; H), each time each time replacing the second term with the first term from the previous iteration, and evaluating the first term on the previous evaluation of m (x; H), until a value of $\mu_k$ is found for which the extended mean shift vector m (x; H) is sufficiently close to zero; and partitioning data points of the signal by grouping said data points that converge into the same extrema.

4. The method of claim 1, wherein the step of estimating the covariance comprises the steps of defining the covariance by $$A\Sigma = B$$

where $A = (m_1; \ldots; m_{t_u})^T H^{-T}$ is a D×D dimensional positive definite matrix and $B = (b_i; \ldots; b_{t_u})^T$, with $\Sigma H^{-1} m_i \approx b_i \equiv \mu - x_i - m_i$; and evaluating the equation $$\Sigma^* = U_P \Sigma_P^{-1} U_{\tilde{Q}} \Sigma_{\tilde{Q}} U_{\tilde{Q}}^T \Sigma_P^{-1} U_P^T;$$

where $A^T A = U_P \Sigma_P^2 U_P^T$ and $B^T B \equiv Q$ with $\tilde{Q} = \Sigma_P U_P^T Q U_P \Sigma_P = U_{\tilde{Q}} \Sigma_{\tilde{Q}}^2 U_{\tilde{Q}}^T$ are symmetric Schur decompositions.

5. The method of claim 1, wherein the most stable estimate of $\mu$ and $\Sigma$ is found by calculating, for a neighborhood a about each bandwidth value h, a Jensen-Shannon divergence defined by $$JS(h) = \frac{1}{2} \log \frac{\left| \frac{1}{2a+1} \sum_{j=h-a}^{h+a} \Sigma_j \right|}{\sqrt[2a+1]{\prod_{j=h-a}^{h+a} |\Sigma_j|}} +$$

$$\frac{1}{2} \sum_{j=h-a}^{h+a} (\mu_j - \mu)^T \left( \sum_{j=h-a}^{h+a} \Sigma_j \right)^{-1} (\mu_j - \mu)$$

where $\mu = \frac{1}{2a+1} \sum_{h-a}^{h+a} \mu_j$, and finding an extrema of said divergences.

6. A method for analyzing three-dimensional structures in medical images, in order to determine the shape and orientation of a tumor whose location has been marked, said method comprising the steps of:

sampling a set of starting points from a neighborhood of a marker;

estimating an extrema $\mu$ by performing mean shift-based gradient-ascent iterations for a set of bandwidths H;

performing a regular sampling of points in a neighborhood of the extrema estimate $\mu$;

estimating a spread and orientation about the extrema $\mu$ by estimating a covariance $\Sigma$ of the sampling of points of the extrema $\mu$; and estimating the stability of $\mu$ and $\Sigma$ by calculating a Jensen-Shannon divergence.

7. A method for determining the location, shape and orientation of a tumor in a medical image, said method comprising the steps of:

defining an extended fixed-bandwidth mean shift vector m(x; H) by an equation defined by $$m(x; H) \equiv \frac{\int u \Phi(x - u; H) f(u) du}{\int \Phi(x - u; H) f(u) du} - x$$

wherein x is a spatial location corresponding to a signal measurement, and wherein $\Phi(x-\mu; H)$ can be defined as $$\exp\left(-\frac{1}{2} D^2(x, \mu; H)\right)$$

where $D^2(x,\mu; H) = (x-\mu)^T H^{-1}(x-\mu)$ and $H^{-1}$ is a weighted harmonic mean of the bandwidth matrices, $$H^{-1}(x) = \sum_{i=1}^{n} w_i(x) H_i,$$

and where the weights can be defined as $$w_i(x) = \frac{\frac{1}{|H_i|^{\frac{1}{2}}} \exp\left(-\frac{1}{2} D^2(x, \mu; H_i)\right)}{\sum_{i=1}^{n} \frac{1}{|H_i|^{\frac{1}{2}}} \exp\left(-\frac{1}{2} D^2(x, \mu; H_i)\right)}$$

and can be normalized to unity $\Phi(x-\mu; H)$;

making an estimate of an extrema and evaluating the extended fixed-bandwidth mean shift vector for this extrema, wherein $y_1$ is used to denote the first term of m(x; H) for the initial estimate of $\mu_1$;

evaluating the extended fixed-bandwidth mean shift vector m(x; H), replacing the second term with $y_1$ and replacing the initial estimate of $\mu_1$ with the previous evaluation of m(x; H);

repeating said evaluations of the extended fixed-bandwidth mean shift vector m(x; H), each time each time replacing the second term with the first term from the previous iteration, and evaluating the first term on the previous evaluation of m (x; H), until a value of $\mu_k$ is found for which the extended mean shift vector m (x; H) is sufficiently close to zero;

partitioning data points of the signal by grouping said data points that converge into the same extrema;

estimating the D-dimensional spread and orientation of the signal by defining the covariance as $A\Sigma=B$ where $A=(m_1; \ldots ; m_{t_u})^T H^{-T}$ is a D×D dimensional positive definite matrix and $B=(b_i; \ldots ; b_{t_u})^T$, with $\Sigma H^{-1} m_i \approx b_i \equiv \mu - x_i - m_i$ and evaluating the equation $\Sigma^* = U_P \Sigma_P^{-1} U_{\tilde{Q}} \Sigma_{\tilde{Q}} U_{\tilde{Q}}^T \Sigma_P^{-1} U_P^T$; where $A^T A = U_P \Sigma_P^2 U_P^T$ and $B^T B \equiv Q$ with $\tilde{Q} = \Sigma_P U_P^T Q U_P \Sigma_P = U_{\tilde{Q}} \Sigma_{\tilde{Q}}^2 U_{\tilde{Q}}^T$ are symmetric Schur decompositions; and finding a most stable estimate of $\mu$ and $\Sigma$ from the at least one extrema $\mu$ and covariances $\Sigma$ by calculating, for a neighborhood a about each bandwidth value h, a Jensen-Shannon divergence defined by $$JS(h) = \frac{1}{2} \log \frac{\left| \frac{1}{2a+1} \sum_{j=h-a}^{h+a} \Sigma_j \right|}{\sqrt[2a+1]{\prod_{j=h-a}^{h+a} |\Sigma_j|}} +$$

$$\frac{1}{2} \sum_{j=h-a}^{h+a} (\mu_j - \mu)^T \left( \sum_{j=h-a}^{h+a} \Sigma_j \right)^{-1} (\mu_j - \mu)$$

where $\mu = \frac{1}{2a+1} \sum_{h-a}^{h+a} \mu_j,$ and finding an extrema of said divergences, to find from the signal f an optimal estimate of a target structure.

8. A program storage device readable by a computer, tangibly embodying a program of instructions executable by the computer to perform the method steps for analyzing three-dimensional structures in medical images, in order to determine the location, shape and orientation of a tumor, said method steps comprising:

finding at least one spatial extrema $\mu$ of a D-dimensional spatial signal f for a set of bandwidths H;

estimating a D-dimensional spread and orientation of the signal about each extrema $\mu$ by estimating a covariance $\Sigma$ of the signal f for each extrema $\mu$; and finding a most stable estimate of $\mu$ and $\Sigma$ from the at least one extrema $\mu$ and covariances $\Sigma$ to find from the signal f an optimal estimate of a target structure wherein the spatial extrema $\mu$ of signal f are found by solving an equation defined by $$m(x; H) \equiv \frac{\int u\Phi(x-u; H)f(u)du}{\int \Phi(x-u; H)f(u)du} - x$$

where m(x; H) is an extended fixed-bandwidth mean shift vector, x is a spatial location corresponding to a signal measurement, and $\Phi(x-u; H)$ is a Gaussian kernel for a bandwidth H.

9. The computer readable program storage device of claim 8, wherein $\Phi(x-\mu; H)$ can be defined as $$\exp\left(-\frac{1}{2}D^2(x, \mu; H)\right)$$

wherein $D^2(x,\mu; H)=(x-\mu)^T H^{-1}$ is a weighted harmonic mean of the bandwidth matrices, $$w_i(x) = \frac{\frac{1}{|H_i|^{\frac{1}{2}}}\exp\left(-\frac{1}{2}D^2(x, \mu; H_i)\right)}{\sum_{i=1}^{n}\frac{1}{|H_i|^{\frac{1}{2}}}\exp\left(-\frac{1}{2}D^2(x, \mu; H_i)\right)}$$

and wherein the weights can be defined as $$w_i(x) = \frac{\frac{1}{|H_i|^{\frac{1}{2}}}\exp\left(-\frac{1}{2}D^2(x, \mu; H_i)\right)}{\sum_{i=1}^{n}\frac{1}{|H_i|^{\frac{1}{2}}}\exp\left(-\frac{1}{2}D^2(x, \mu; H_i)\right)}$$

and can be normalized to unity.

10. The computer readable program storage device of claim 8, the method steps for finding the spatial extrema $\mu$ of signal f comprises:

making an estimate of an extrema and evaluating the extended fixed-bandwidth mean shift vector for this extrema, wherein $y_1$ is used to denote the first term of m(x; H) for the initial estimate of $\mu_1$;

evaluating the extended fixed-bandwidth mean shift vector m(x; H), replacing the second term with $y_1$ and replacing the initial estimate of $\mu_1$ with the previous evaluation of m(x; H);

repeating said evaluations of the extended fixed-bandwidth mean shift vector m(x; H), each time each time replacing the second term with the first term from the previous iteration, and evaluating the first term on the previous evaluation of m (x; H), until a value of $\mu_k$ is found for which the extended mean shift vector m (x; H) is sufficiently close to zero; and partitioning data points of the signal by grouping said data points that converge into the same extrema.

11. The computer readable program storage device of claim 8, wherein the method steps for estimating the covariance comprises defining the covariance by $$A\Sigma=B$$

where $A=(m_1; \ldots ; m_{t_u})^T H^{-T}$ is a DxD dimensional positive definite matrix and $B=(b_i; \ldots ; b_{t_u})^T$, with $\Sigma H^{-1} m_i \approx b_i \equiv \mu - x_i - m_i$; and evaluating the equation $$\Sigma^* = U_P \Sigma_P^{-1} U_{\tilde{Q}} \Sigma_{\tilde{Q}} U_{\tilde{Q}}^T \Sigma_P^{-1} U_P^T;$$

where $$A^T A = U_P \Sigma_P^2 U_P^T \text{ and } B^T B \equiv Q \text{ with } \tilde{Q} = \Sigma_P U_P^T Q U_P \Sigma_P = U_{\tilde{Q}} \Sigma_{\tilde{Q}}^2 U_{\tilde{Q}}^T$$

are symmetric Schur decompositions.

12. The computer readable program storage device of claim 8, wherein the method steps for finding the most stable estimate of $\mu$ and $\Sigma$ comprise calculating, for a neighborhood a about each bandwidth value h, a Jensen-Shannon divergence defined by $$JS(h) = \frac{1}{2}\log\frac{\left|\frac{1}{2a+1}\sum_{j=h-a}^{h+a}\Sigma_j\right|}{\sqrt[2a+1]{\prod_{j=h-a}^{h+a}|\Sigma_j|}} +$$

$$\frac{1}{2}\sum_{j=h-a}^{h+a}(\mu_j-\mu)^T\left(\sum_{j=h-a}^{h+a}\Sigma_j\right)^{-1}(\mu_j-\mu)$$

where $$\mu = \frac{1}{2a+1}\sum_{h-a}^{h+a}\mu_j,$$

and finding an extrema of said divergences.

* * * * *